UNITED STATES PATENT OFFICE.

PETER C. VOGELLUS, OF GLOUCESTER, ASSIGNOR TO WILLIAM N. LE PAGE AND REUBEN BROOKS, OF ROCKPORT, MASSACHUSETTS.

PROCESS OF DESALTING THE SKINS, BONES, AND TISSUES OF SALT FISH.

SPECIFICATION forming part of Letters Patent No. 244,502, dated July 19, 1881.

Application filed April 2, 1881. (No specimens.)

*To all whom it may concern:*

Be it known that I, PETER C. VOGELLUS, of Gloucester, in the county of Essex and State of Massachusetts, have invented certain new and useful improvements in processes of separating salt from refuse obtained in salt-fish skinneries for the purpose of making glue from the said refuse, at the same time making use of the salt and realizing a profit therefrom; and I do hereby declare the following to be a full, clear, and exact description of the invention, such as will enable others skilled in the art to which it pertains to make and use it.

My invention relates to an improvement in processes for the extraction of salt from the skins, bones, and other tissues of salt fish; and it consists in subjecting them to the action of any chemical capable of decomposing the salt with which they are impregnated and to leave them in a condition highly favorable to the extraction of their gelatinous element.

Heretofore in desalting fish-tissues preparatory to extracting their gelatine, as aforesaid, it has been customary to immerse them in water-baths and subject them to agitation, the baths being successively renewed as soon as saturated with salt until all traces of it are dissolved out of and eliminated from the tissues treated. The tissues thus desalted are then subjected to various manipulations in the extraction of their gelatine, and of this hereinafter.

The particular object of my invention is to subject the said fish-tissues to the chemical action of an acid capable of decomposing their salt and to unite with it in forming valuable chemical combinations, which will, in turn, act upon and decompose the calcareous salts and other objectionable elements of a like nature existing in the tissues, thus securing to them a far purer condition than could possibly be obtained by any of the old processes.

Among the chemicals which I may employ for effecting the results hereinbefore described I have discovered sulphuric acid to be particularly valuable and effective. However, in using it I have found that it must be very much diluted to prevent its reaction upon the histose or cellular fish-tissue. I therefore dilute it until such reactory action is made impossible.

With the simple hydrate of sulphuric acid diluted with an equal weight of water admirable results are obtained. The tissues may be subjected to the action of the solution in open vats; but the decomposition of the salt is more rapidly effected by placing them in a closed vessel and forcing the hydrated sulphuric acid thereinto under pressure. The resultant chemical action, the sulphuric acid being in excess, is first to decompose the sodium chloride or salt to produce hydrochloric acid and sulphate of soda; and, second, the hydrochloric acid acting upon the calcareous element in the tissues decomposes it, together with other impurities of a like nature. The result of this twofold action will be to leave the tissues in a perfectly desalted, purified, and highly hygroscopic condition, readily acted upon by steam or water to produce a superfine quality of gelatine or glue. After the chemical action between the sulphuric acid and chlorate of sodium, and also the ensuing action between the hydrochloric acid and calcareous salts, has ceased, the acid-bath is drawn off from the purified tissue, that part of the bath adhering thereto through the affinity of cohesion being removed by washing it in water preferably heated to about 91.5° Fahrenheit, as at this temperature sulphate of soda is most soluble in water. The gelatine may now be extracted from the desalted tissues by subjecting it to the action of heated water or of water in a state of tense vaporization by means of a digester. When the sulphuric acid in the acid-bath is nearly or totally exhausted it is subjected to distillation, as in the usual process for the manufacture of hydrochloric acid; or the acid-bath may be saturated with ammoniacal waters and evaporated, thus forming a valuable fertilizer.

If desired, the gelatine and salt in the fish-tissues may be simultaneously extracted, and the resulting solution treated as aforesaid by suitable chemicals—sulphuric acid preferred.

Having fully described my invention, what I claim as new, and desire to secure by Letters Patent, is—

1. A process of desalting the skins, bones, and other tissues of salt fish, consisting in subjecting them to the action of chemicals capable of decomposing the salt with which they are impregnated, substantially as set forth.

2. A process of desalting the skins, bones, and other tissues of salt fish, consisting in subjecting them to the action of chemicals capable of decomposing their sodium chloride and calcareous salts, substantially as set forth.

3. A process of desalting the skins, bones, and other tissues of salt fish, consisting in subjecting them to the action of sulphuric acid, which decomposes their salt and unites with it to produce sulphate of soda and hydrochloric acid, which latter acts upon and decomposes the calcareous salts and similar substances in the tissues, leaving them in a perfectly desalted and purified condition, substantially as set forth.

In testimony that I claim the foregoing I have hereunto set my hand this 22d day of March, 1881.

PETER CARLYLE VOGELLUS.

Witnesses:
GEORGE W. LEDGER,
SUSANNA D. YORK,
REUBEN BROOKS.